United States Patent
Sakazume (10) Patent No.: US 12,419,443 B2
(45) Date of Patent: Sep. 23, 2025

(54) FURNITURE FOR, INTER ALIA, APPRECIATING ARTICLE

(71) Applicant: SOMAR CORPORATION, Tokyo (JP)

(72) Inventor: Naoki Sakazume, Tokyo (JP)

(73) Assignee: SOMAR CORPORATION, Tokyo (JP)

( * ) Notice: Subject to any disclaimer, the term of this patent is extended or adjusted under 35 U.S.C. 154(b) by 0 days.

(21) Appl. No.: 18/690,312

(22) PCT Filed: Feb. 15, 2023

(86) PCT No.: PCT/JP2023/005175
§ 371 (c)(1),
(2) Date: Mar. 8, 2024

(87) PCT Pub. No.: WO2023/171267
PCT Pub. Date: Sep. 14, 2023

(65) Prior Publication Data
US 2024/0268577 A1    Aug. 15, 2024

(30) Foreign Application Priority Data

Mar. 10, 2022  (JP) .................. 2022-037163

(51) Int. Cl.
*A47F 3/00*   (2006.01)
*C09D 5/00*   (2006.01)

(52) U.S. Cl.
CPC .............. *A47F 3/005* (2013.01); *C09D 5/006* (2013.01)

(58) Field of Classification Search
CPC .... A47F 3/00; A47F 3/005; A47F 3/14; A47F 3/145; C09D 5/006
See application file for complete search history.

(56) References Cited

U.S. PATENT DOCUMENTS

| 846,191 A | * | 3/1907 | Egly | ............... | A47F 3/005 |
| | | | | | 359/801 |
| 10,194,759 B1 | * | 2/2019 | Didur | ............ | F21V 23/003 |

(Continued)

FOREIGN PATENT DOCUMENTS

| CN | 113272136 A | 8/2021 | | |
| EP | 0670129 A1 | * 9/1995 | ............. | A37F 3/001 |

(Continued)

OTHER PUBLICATIONS

Obomodulan PU boards Sep. 21, 2021 (Year: 2021).*

(Continued)

*Primary Examiner* — Andrew Roersma
(74) *Attorney, Agent, or Firm* — Rankin, Hill & Clark LLP (57) ABSTRACT

A furniture used for appreciation, etc. of an article, comprising an antireflection film is provided, wherein the antireflection film is effective to enhance an enchantment of an article as an object to be exhibited and has high designability. A collection case 1, as an example of the furniture used for appreciation, etc. of an article, comprises a bottom member 2 for mounting an article G as an object to be exhibited, and a transparent cover 4 to enclose an article G mounted on the bottom member 2 to see through it. On a main surface side for mounting an article G of the bottom member 2 is provided with a black antireflection film 9. The antireflection film 9 is formed of a membrane made from a liquid composition having a specific composition to be a thickness of 2 μm or more and 40 μm or less by spray coating.

9 Claims, 2 Drawing Sheets (56) References Cited

U.S. PATENT DOCUMENTS

| | | | | |
|---|---|---|---|---|
| 2012/0316265 A1* | 12/2012 | Kubota | .................. | G02B 1/111 |
| | | | | 977/773 |
| 2014/0147777 A1* | 5/2014 | Inoue | ..................... | G02F 1/167 |
| | | | | 430/32 |
| 2016/0058206 A1* | 3/2016 | Schwalbach | ......... | H02J 7/0042 |
| | | | | 361/752 |
| 2016/0106233 A1* | 4/2016 | Mitchell | ................ | A47F 3/005 |
| | | | | 312/138.1 |
| 2016/0174675 A1* | 6/2016 | Bedman | ................. | A47F 3/005 |
| | | | | 206/6.1 |
| 2019/0090659 A1* | 3/2019 | Fixler | ..................... | A47F 3/001 |
| 2019/0334037 A1* | 10/2019 | Fujimaki | ................ | C09D 7/20 |
| 2020/0284950 A1* | 9/2020 | Shibamoto | ............... | G02B 1/14 |
| 2022/0330720 A1* | 10/2022 | Patel | ....................... | A47F 3/004 |
| 2023/0305197 A1* | 9/2023 | Sakazume | ................ | G02B 5/00 |
| 2024/0100484 A1* | 3/2024 | Sakazume | ......... | B01D 67/0011 |
| 2024/0329278 A1* | 10/2024 | Sakazume | ............... | G01S 17/86 |
| 2024/0336783 A1* | 10/2024 | Sakazume | ............... | G02B 5/02 |
| 2024/0337902 A1* | 10/2024 | Sakazume | ........... | G03B 11/045 |
| 2024/0392126 A1* | 11/2024 | Sakazume | ............ | C09D 201/00 |

FOREIGN PATENT DOCUMENTS

| | | | | | |
|---|---|---|---|---|---|
| FR | 1015067 | A | * | 8/1952 | ............... A47F 3/00 |
| FR | 2301205 | A1 | * | 9/1976 | ............... A47F 3/00 |
| FR | 3123548 | A1 | * | 12/2022 | ................ A47F 11/10 |
| JP | 3029368 | U | | 9/1996 | |
| JP | 2000-169191 | A | | 6/2000 | |
| JP | 2008225099 | A | * | 9/2008 | |
| JP | 2008241767 | A | * | 10/2008 | |
| JP | 2010247396 | A | * | 11/2010 | |
| JP | 2012-194514 | A | | 10/2012 | |
| JP | 2012-200369 | A | | 10/2012 | |
| JP | 2013-100456 | A | | 5/2013 | |
| JP | 2013208513 | A | * | 10/2013 | |
| JP | 2014052598 | A | * | 3/2014 | |
| JP | 2018-52804 | A | | 4/2018 | |
| JP | 2018-525667 | A | | 9/2018 | |
| KR | 10-2006-0109939 | A | | 10/2006 | |
| KR | 10-2014-0132707 | A | | 11/2014 | |
| KR | 1020140140139 | A | * | 12/2014 | ........... C09D 183/02 |
| KR | 10-2014-0140139 | B1 | | 6/2020 | |
| WO | WO-9316625 | A1 | * | 9/1993 | ............. A47F 3/005 |
| WO | WO-2011145473 | A1 | * | 11/2011 | ............. C08G 73/14 |
| WO | 2018/143371 | A1 | | 8/2018 | |
| WO | 2021/132585 | A1 | | 7/2021 | |
| WO | WO-2022045319 | A1 | * | 3/2022 | ............... G02B 1/10 |
| WO | WO-2022213016 | A1 | * | 10/2022 | ............. C08G 59/50 |

OTHER PUBLICATIONS

International Search Report Corresponding to International Application No. PCT/JP2023/005175 dated Apr. 25, 2023, 2 pages.
Korean Office Action dated May 17, 2024 issued in corresponding Korean application No. 10-2024-7008517; English translation included (12 pages).
Chinese Office Action dated Jun. 17, 2024 issued in corresponding Chinese application No. 202380013412.6; English translation included (12 pages).

* cited by examiner

FURNITURE FOR, INTER ALIA, APPRECIATING ARTICLE

This application is a U.S. national phase filing under 35 U.S.C. § 371 of PCT Application. No. PCT/JP2023/005175, filed on Feb. 15, 2023, which is hereby incorporated by reference in its entirely by reference.

TECHNICAL FIELD

The present invention relates to a furniture used for housing a variety of articles (e.g. toys (a model and figure, etc.), arts and crafts, etc.) and being placed, for example, on a shelf or desk for the purpose of admiring, storing and exhibiting (hereinafter, abbreviated to "appreciation, etc.").

BACKGROUND ART

As a furniture used for appreciation, etc. of an article, there is known a collection case comprising a mounting stand for mounting an article as an object for appreciation, etc. and a transparent cover for enclosing an article so as to be able to see an article through it (Patent Document 1). To suppress reflection of light from behind (so called halation) due to an irradiation light (illumination light and sun light, etc.) and to make a contour and sharpness of an article clear so as to enhance an enchantment of an article, an effect of antireflection is sometimes given by coloring in black a main surface side of a mounting stand for mounting an article, which is behind of an article, or by adhering a black cloth or paper, etc. in a sheet shape to the main surface side of a mounting stand for mounting an article.

RELATED ART DOCUMENTS

Patent Document

Patent Document 1: Japanese Utility Model Registration No. 3029368

SUMMARY OF THE DISCLOSED SUBJECT MATTER

A mounting stand of a furniture of this kind may be seen by a user together with an article as an object for appreciation, etc., so that a high appearance quality may be desired in some cases in addition to an antireflection effect. Specifically, there have been demands for providing a black-colored antireflection film (for example, an uneven film) with high designability in some cases.

The present invention was made in consideration with the circumstances above. The present invention has an object thereof to provide a furniture used for appreciation, etc. of an article, which is effective for enhancing an enchantment of an article as an object for appreciation, etc. and is provided with an antireflection film with high designability.

The present inventors conducted studies diligently and found that, when a black antireflection film formed on a mounting stand of a furniture used for appreciation, etc. of an article fulfills the requirements below, it is also effective to enhance an enchantment of an article as an object for appreciation, etc. and to improve the designabilit.

To use a liquid composition having a specific composition of comprising a predetermined ratio of unevenness forming particles, and the unevenness forming particles comprise, in a range of a predetermined mass ratio, large and small inorganic particles having particle diameters in predetermined ranges.

To use a liquid composition having the specific composition as above to form a membrane having a predetermined thickness by spray coating.

Based on these newly acquired knowledge, the present inventors completed the invention as provided below and attained the object above.

Below, (A) indicates a resin component, (B) unevenness forming particles, (B1) inorganic small particles having a particle diameter ($d_1$) of 0.05 μm or more and 0.4 μm or less, (B2) inorganic large particles having a particle diameter ($d_2$) of 2 μm or more and 6 μm or less, and (C) diluent solvent.

According to the present invention, there is provided a furniture used for appreciation, etc. of an article, comprising at least a mounting stand for mounting an article, wherein
   the mounting stand has a black antireflection film on a main surface side for mounting an article; and
   the antireflection film is formed of a membrane made from a liquid composition to have a thickness of 2 μm or more and 40 μm or less by spray coating;
   the liquid composition comprises at least (A), (B) and (C): wherein
   (B) is contained in an amount of 20% by mass or more and 60% by mass or less in a total amount of 100% by mass of all solid content in the composition;
   (B) comprises (B1) and (B2) in an amount of 90% by mass or more, and a mass ratio of (B2) with respect to (B1): 1 is 1.8 or more and 3.3 or less.

According to the present invention, there is provided a black antireflection film formed on a mounting stand for mounting an article of a furniture used for appreciation, etc. of an article, formed of a membrane made from a liquid composition to have a thickness of 2 μm or more and 40 μm or less by spray coating, wherein:
   the liquid composition comprises at least (A), (B) and (C): wherein
   (B) is contained in an amount of 20% by mass or more and 60% by mass or less in a total amount of 100% by mass of all solid content in the composition;
   (B) comprises (B1) and (B2) in an amount of 90% by mass or more, and a mass ratio of (B2) with respect to (B1): 1 is 1.8 or more and 3.3 or less.

The liquid composition above may include the following modes.
   Preferably, (B2) comprises silica.
   Preferably, silica includes composite silica colored black with a colorant.
   Preferably, (B1) comprises carbon black.
   Preferably, viscosity at 25° C. is 1 mPa·s or more and 30 mPa·s or less.

The antireflection film above may include the following modes.
   On an outermost surface of a plane formed with a membrane, it is preferable that glossiness against an incident light with an incident angle of 60° (hereinafter, also simply referred to as "60°-glossiness") is less than 1%, glossiness against an incident light with an incident angle of 85° (hereinafter, also simply referred to as "85°-glossiness") is less than 5%, reflectance against a light having a wavelength of 550 nm (hereinafter, also simply referred to as "reflectance") is 4% or less, an L value in CIELAB color space system by SCE method is 22 or less, and an optical density is 1.0 or more.
   On an outermost surface of a plane formed with a membrane, it is preferable that a maximum height Rz based on JIS B0601:2001 (hereinafter, also simply referred to as "Rz") is 7 µm or more, an average length Rsm of contour curve elements (hereinafter, also simply referred to as "Rsm") is 80 µm or more, a skewness Rsk of a contour curve (hereinafter, also simply referred to as "Rsk") is 0.3 or less, and Kurtosis Rku of a contour curve (hereinafter, also simply referred to as "Rku") is 3 or more.

According to the present invention, there is provided a furniture used for appreciation, etc. of an article, such as a collection case, etc., which is effective to enhance an enchantment of an article as an object for appreciation, etc. and is provided with an antireflection film having high designability.

EXEMPLARY MODE FOR CARRYING OUT THE DISCLOSED SUBJECT MATTER

Below, the best modes for carrying out the invention will be explained, however, the present invention is not limited to the modes below and also includes those obtained by suitably modifying or improving the modes explained below based on ordinary knowledge of persons skilled in the art within the scope of the present invention.

As to a range of value in the present specification, an uppermost value or a lowermost value described in certain value ranges may be replaced by values indicated in the examples.

In the present specification, when there are a plurality of kinds of substances falling under each component in a composition, a content ratio or a content in each component in the composition indicates a content ratio or a content of a total of the plurality of kinds of substances being in the composition unless otherwise mentioned.

As shown in FIG. 1 to FIG. 4, a collection case 1 according to one mode of the present invention comprises a bottom member (mounting stand) 2 for mounting an article G as an object for appreciation, etc. (refer to FIG. 3 and FIG. 4), and a transparent cover 4 for enclosing the article G mounted on the bottom member 2 to see through it. The transparent cover 4 is formed to be a parallel-piped rectangular shape having an opening 4a facing downward and has a housing room 4b therein. The transparent cover 4 is attached to the bottom member 2 in a detachable way.

A material of the bottom member 2 is not particularly limited and is formed by a synthetic resin, etc. The transparent cover 4 has transparency of, for example, exceeding light transmittance of glass and is preferably constituted by a transparent synthetic resin (an acrylic resin, etc.) with excellent workability. When selecting a transparent resin as a material of the transparent cover 4, the entire transparent cover 4 becomes transparent and visibility improves when seeing an article G to be mounted, so that it is effective.

Figure 1:
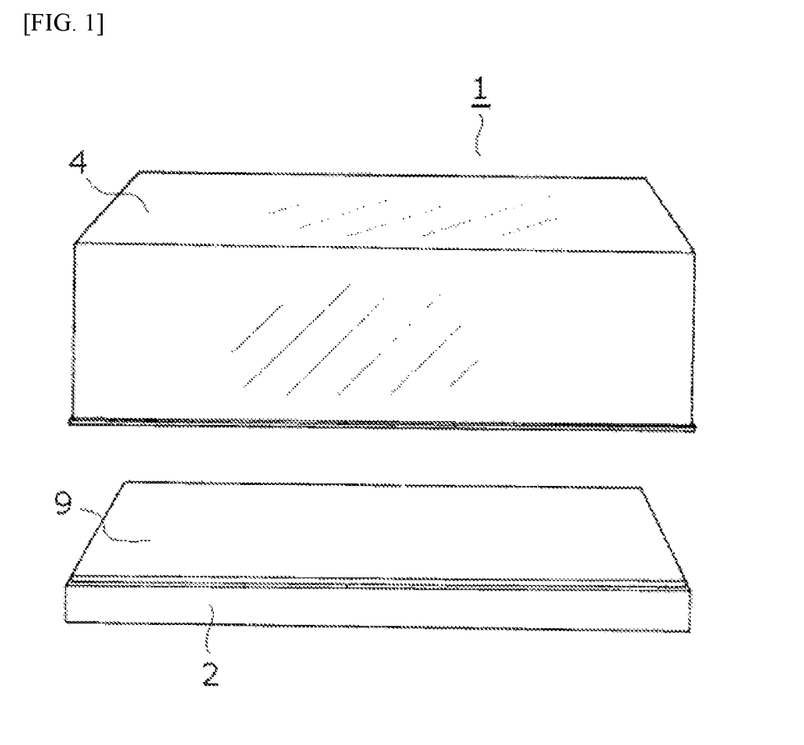
FIG. 1 is a view showing a configuration example of a collection case as an example of a furniture according to the present invention.
Figure 2:
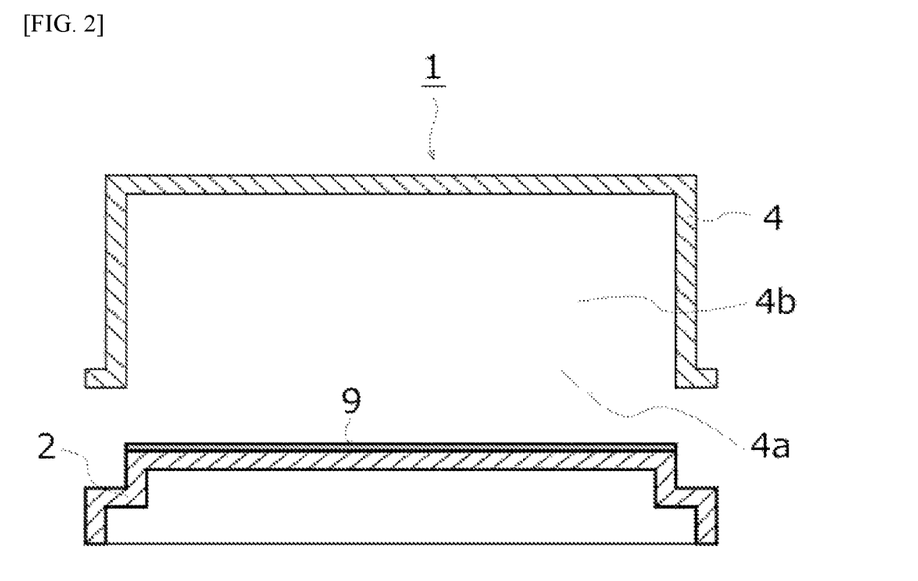
FIG. 2 is a sectional view of FIG. 1.
Figure 3:
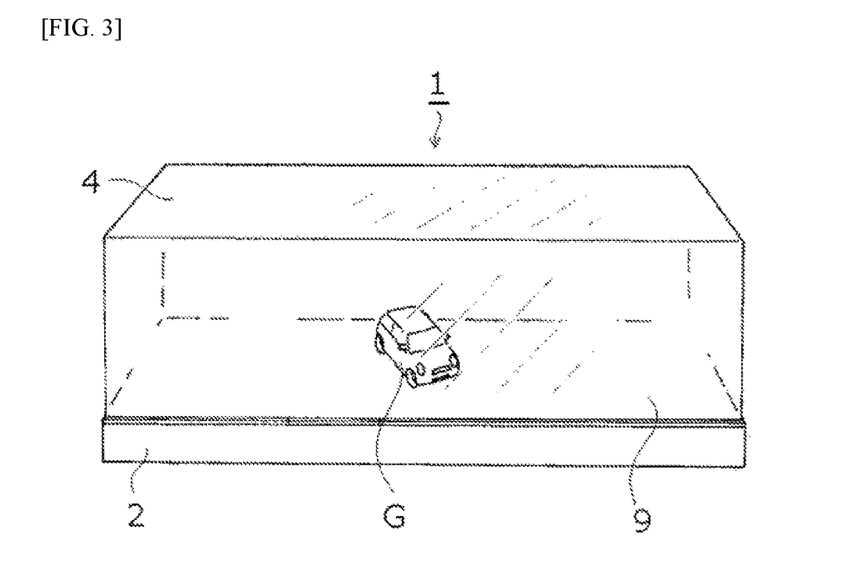
FIG. 3 is a view showing an example wherein an article as an object for appreciation, etc. is placed in the case in FIG. 1.
Figure 4:
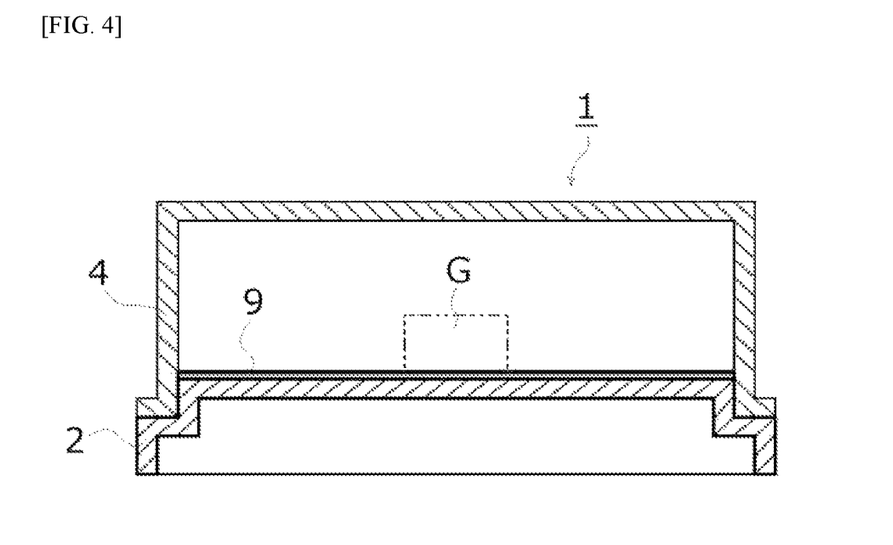
FIG. 4 is a sectional view of FIG. 3.

Note that, in the example in FIG. 3 and FIG. 4, it is configured that the bottom member 2 is enclosed by the transparent cover 4, consequently an article G can be seen through the transparent cover 4, however, it is not limited to this mode. For example, there is a case where a collection case 1 is configured only by a bottom member 2 and an article G is exhibited in an exposed state.

When the collection case 1 includes a transparent cover 4, a locking mechanism (not illustrated) of the bottom member 2 and the transparent cover 4 may be provided, as well. In a state of closing a lid without a lock, wherein a bottom member 2 is fit in an opening 4a of a transparent cover 4, the both (the bottom member 2 and the transparent cover 4) are separatable, while in a state of closing a lid with a lock of any type to lock the both, the two become inseparable. When a collection case 1 comprises a transparent cover 4, all or a part of the transparent cover 4 may be configured to be openable, so that an article G can be placed on the bottom member 2 and taken out therefrom.

(Black Antireflection Film)

In the present example, a blac antireflection film 9 is provided on a part or all of a main surface side of the bottom member 2 for mounting an article G. As it is "on the main surface side", it includes the mode of directly forming the antireflection film 9 on the main surface for mounting an article G of the bottom member 2 and the mode of forming it via an optional layer (for example, a primer layer, etc.) between the bottom member 2 and the antireflection film 9. As it is "on a part or all", it includes the case of forming the antireflection film 9 on a part of a main surface side for mounting an article G of the bottom member 2.

An antireflection film 9 of the present example is configured by a membrane formed from a liquid composition.

<Liquid Composition>

A liquid composition according to one mode of the present invention (hereinafter, also referred to as "a composition") is used for forming a membrane on a main surface side of a bottom member 2 (hereinafter, also simply referred to as "an object to be coated"), on which an article G is mounted, and comprises (A) a resin component, (B) unevenness forming particles and (C) a diluent solvent. The (B) used for forming a composition comprises (B1) small particles having a particle diameter ($d_1$) of 0.05 µm or more and 0.4 µm or less and (B2) large particles having a particle diameter ($d_2$) of 2 µm or more and 6 µm or less, and it may also comprise components other than (B1) and (B2). Namely, a composition according to one mode of the present invention is configured by comprising (A), (B1), (B2) and (C). A composition according to one mode may be used suitably in spray coating when applying to a surface of an object to be coated.

—(A)—

(A) to be used for forming a composition serves as a binder of (B). A material of (A) is not particularly limited and either of a thermoplastic resin and thermosetting resin may be used. As a thermosetting resin, for example, an acrylic-type resin, urethane-type resin, phenol-type resin, melamine-type resin, a urea-type resin, diallyl phthalate-type resin, unsaturated polyester-type resin, epoxy-type resin and alkyd-type resin, etc. may be mentioned. As a thermoplastic resin, a polyacrylic ester resin, polyvinyl chloride resin, butyral resin and styrene-butadiene copolymer resin, etc. may be mentioned. In terms of heat resistance, moisture resistance, solvent resistance and surface hardness of an uneven membrane to be formed, a thermosetting resin is preferably used as (A). As a thermosetting resin, when considering flexibility and strength of a membrane to be formed, an acrylic resin is particularly preferable. As (A), one kind may be used alone or two or more kinds may be combined for use.

A content (a total amount) of (A) is not particularly limited, however, when considering a blending balance with other components, it is preferably 5% by mass or more, more preferably 15% by mass or more, furthermore preferably 25% by mass or more and preferably 50% by mass or less, more preferably 45% by mass or less and furthermore preferably 40% by mass or less with respect to a total amount (100% by mass) of a total solid content in the composition.

—(B)—

It is essential that the (B) to be used for forming a composition comprises a plurality of unevenness forming particles having different sizes in combination. Particularly, (B1) small particles and (B2) large particles are combined to be used as (B). For example, in the case of composing (B) only of two kinds of unevenness forming particles having different sizes (namely, (B1) and (B2)), a particle diameter ($d_2$) of (B2) is preferably 10 times or more, more preferably 15 times or more a particle diameter ($d_1$) of (B1) and preferably 40 times or less and more preferably 35 times or less. When using as (B) three or more kinds of unevenness forming particles having different sizes, a particle diameter ($d_{max}$) of unevenness forming particles with a maximum particle diameter and a particle diameter ($d_{min}$) of unevenness forming particles with a minimum particle diameter may be adjusted to have the relationship above (namely, ($d_{max}$) is preferably 10 times or more, more preferably 15 times or more the size of ($d_{min}$) and preferably 40 times or less and more preferably 35 times or less the size of ($d_{min}$)).

In one mode, ($d_1$) is preferably 0.05 μm or more, more preferably 0.1 μm or more and preferably 0.4 μm or less and more preferably 0.3 μm or less. ($d_2$) is preferably 2 μm or more, more preferably 3 μm or more and preferably 6 μm or less, more preferably 5 μm or less and furthermore preferably 4 μm or less.

A particle diameter ($d_1$) of (B1) and a particle diameter ($d_2$) of (B2) are a median diameter based on volume measured by a laser diffraction/scattering particle size distribution measuring apparatus.

In one mode, a mass ratio of (B2) in (B) is, with respect to (B1):1, preferably exceeding 1.75, more preferably 1.8 or more and preferably less than 3.58 and more preferably 3.3 or less. The present inventors found that by using (B1) and (B2) having the specific ranges of particle diameters as explained above combined in a range of this mass ratio, one particle (B1) is easily buried between adjacent two particles (B2) in a membrane to be formed. As a result, low glossiness and low reflection on the membrane surface can be realized and a degree of blackness becomes high (an L value becomes low).

A total content (total amount) of (B1) and (B2) in (B) is preferably 90% by mass or more and more preferably 95% by mass or more. An upper limit thereof is not particularly limited and is 100% by mass. Namely, in one mode, (B1) and (B2) may be contained preferably 90% by mass or more in 100% by mass of (B).

A content (total amount) of (B) with respect to a total amount (100% by mass) of total solid content in the composition is preferably 20% by mass or more, more preferably 25% by mass or more, furthermore preferably 30% by mass or more and preferably 60% by mass or less, more preferably 50% by mass or less, furthermore preferably 45% by mass or less and particularly preferably 40% by mass or less. When a total amount of (B) is less than 20% by mass, disadvantages of an increase of glossiness and optical density shortage are caused, while when exceeding 60% by mass, (A) in a formed coating film is decreased relatively, which results in a disadvantage that a coating film falls off from an object to be coated.

As (B2), either of resin-type particles and inorganic-type particles may be used. As resin-type particles, for example, a melamine resin, bunzoguanamine resin, benzoguanamine/melamine/formalin condensate, acrylic resin, urethane resin, styrene resin, fluoric resin and silicon resin, etc. may be mentioned. As inorganic-type particles, silica, alumina, calcium carbonate, barium sulfate, titan oxide and carbon, etc. may be mentioned. They may be used alone or in combination of two or more kinds.

To obtain more excellent characteristics, it is preferable to use inorganic-type particles as (B2). By using inorganic-type particles as (B2), a lower glossy and high light-shielding membrane can be formed easily. As inorganic-type particles to be used as (B2), silica is preferable. A shape of (B2) is not particularly limited but it is preferable to use particles having a narrow particle distribution having a CV (Coefficient of Variation) value of, for example, 15 or less (a sharp product) to realize lower glossiness, lower reflectance and a lower L value on a membrane surface to be formed. The CV value is a numerically expressed degree of spread of a particle diameter distribution (variation of particle diameters) with respect to an average value of a particle diameter (calculated average particle diameter). When using a particle as above, a chance of contacting between (B2) and (B1) increases in a membrane to be formed so as to realize furthermore lower glossiness, lower reflectance and a lower L value on the membrane surface.

Also, in order to decrease glossiness on the membrane surface to be formed, a particle in indefinite form is used preferably as (B2). It is particularly preferable to use a porous indefinite-shaped silica particle as (B2). When using particles as above as (B2), lights refract repeatedly inside and surface when formed into a membrane, consequently, a glossiness on the membrane surface can be furthermore reduced.

In one mode, in order to suppress reflection of lights on a surface of a membrane to be formed, (B2) may be colored black by using an organic-type or inorganic-type colorant. As a material therefor, composite silica, conductive silica and black silica, etc. may be mentioned.

As composite silica, for example, what obtained by synthesizing carbon black (hereinafter, also simply referred to as "CB") and silica at a nano level and composing may be mentioned. As conductive silica, for example, what obtained by coating silica particles with conductive particles, such as CB, may be mentioned. As black silica, for example, natural ore containing graphite in silica may be mentioned.

As well as (B2), a material of (B1) is not particularly limited and either of resin-type particles and inorganic-type particles may be used. As resin-type particles, for example, a melamine resin, bunzoguanamine resin, benzoguanamine/melamine/formalin condensate, acrylic resin, urethane resin, styrene resin, fluoric resin and silicon resin, etc. may be mentioned. As inorganic-type particles, silica, alumina, calcium carbonate, barium sulfate, titan oxide and CB, etc. may be mentioned. They may be used alone or in combination of two or more kinds.

As (B1), for example, CB, etc. added as a colorant/conductive agent may be also used. When using CB as (B1), a membrane to be formed is colored, so that an effect of reflection prevention is increased furthermore and a preferable antistatic effect can be obtained.

—(C)—

The (C) used for forming a composition is contained for the purpose of dissolving (A) and adjusting viscosity of the whole composition. When using (C), (A) and other component to be added as needed can be mixed more easily and uniformity of the composition is improved. Also, viscosity of the composition can be adjusted properly, so that, when forming a membrane on a surface of an object to be coated, operability of the composition and uniformity of a thickness when applied can be improved.

As (C), it is not particularly limited as long as it is a solvent capable of dissolving (A), and an organic solvent or water may be mentioned. As an organic solvent, for example, methylethylketone, toluene, propylene glycol monomethyl ether acetate, ethyl acetate, butyl acetate, methanol, ethanol, isopropyl alcohol and butanol, etc. may be used. They may be used alone or in combination of two or more kinds as (C).

A content (total amount) of (C) in a composition is, with respect to 100 parts by mass of (A), preferably 1 part by mass or more, more preferably 3 parts by mass or more and preferably 20 parts by mass or less in order to obtain the effects of containing (C) as explained above.

—(D) Optional Component—

Other than the components ((A), (B) and (C)) above, the composition may contain (D) to an extent of not hindering the effects of the present invention. As (D), for example, a leveling agent, thickener, pH adjusting agent, lubricant, dispersant, defoaming agent, curing agent and reaction catalyst, etc. may be mentioned.

Particularly when using a thermosetting resin as (A), crosslinking of (A) can be accelerated by blending a curing agent. As a curing agent, a urea compound having a functional group, melamine compound, isocyanate compound, epoxy compound, aziridine compound and oxazoline compound, etc. may be mentioned. As a curing agent, isocyanate compound is preferable among them. The curing agent may be used alone or in combination of two or more kinds.

A ratio when blending a curing agent in a composition is, with respect to 100 parts by mass of (A), preferably 10 parts by mass or more and 80 parts by mass or less. When adding a curing agent in this range, hardness of a membrane to be formed is enhanced, consequently, characteristics of the membrane surface can be maintained for a long term even when the membrane is exposed to an environment of rubbing against other member, and low glossiness, a high light-shielding characteristic, low reflectance and a high degree of blackness can be maintained easily.

When a curing agent is contained in a composition, a reaction catalyst may be used together so as to accelerate reaction of the curing agent with (A). As a reaction catalyst, for example, ammonia and aluminum chloride, etc. may be mentioned. A ratio of a reaction catalyst to be contained in the composition is, with respect to 100 parts by mass of a curing agent, preferably 0.1 part by mass or more and 10 parts by mass or less.

A composition according to one mode has viscosity at 25° C. of preferably 1 mPa·s or more, preferably 30 mPa·s or less and more preferably 20 mPa·s or less for the reason of coating by using a spray (spray coating) while maintaining smoothness of the composition on a surface of an object to be coated. When viscosity of the composition is too low, there is a possibility of not being able to form a membrane having a thickness enough to realize a sufficient effect of preventing an occurrence of halation. When viscosity of the composition is too high, it becomes difficult to spray the composition uniformly on a surface of an object to be coated, so that there is a possibility that a membrane having a uniform thickness with less performance variation cannot be obtained.

The viscosity differs depending on components contained in the composition, that is, kinds and molecular weights, etc. of (A) and (B) to be used. Also, when blending (D) in addition to the (A) and (B) above, it differs depending on a kind and molecular weight, etc. of (D). However, it can be adjusted easily by adjusting an amount of (C) in the composition in the range stated above.

A composition according to one mode of the present invention may be prepared (produced) by adding (A), (B) and, when needed, (D) to (C), and mixing and agitating. An order of mixing the respective components is not particularly limited as long as the components are mixed uniformly.

A composition according to one mode of the present invention may be one-liquid type or two-liquid type. When containing a curing agent as (D) in the composition, the composition according to one mode may be two-liquid type with, for example, a first liquid comprising components other than a curing agent and a second liquid comprising a curing agent.

A method of forming a membrane is not particularly limited. A membrane may be formed on an object to be coated by any method or apparatus, for example, spray coating (for example, air spray, airless spray and electrostatic spray, etc.), paint brush, curtain flow coating, roller brush coating, bar coating, kiss roll, metaling bar, gravure roll, reverse roll, dip coating and die coating, etc. may be used.

Particularly, a composition according to one mode preferably forms a membrane by using spray coating, which requires spray of droplet from a small spray hole. In other words, a membrane formed by a liquid composition according to one mode is a spray coated membrane.

According to spray coating using a composition according to one mode, droplets of the composition adhere successively to a surface of an object to be coated and, at the same time, volatilization of (C) in the droplets adhered to the object to be coated proceeds. As a result, a solid content (particles) obtained by removing (C) from droplets laminates successively on the surface of the object to be coated so as to form a solid particle laminate. According to one mode, this solid particle laminate configures a membrane.

In the case of using a composition comprising a thermosetting resin as (A) and furthermore comprising a curable agent as (D), it is preferable that a solid particle laminate is applied to a surface of an object to be coated and, after that, the laminate is heated to be cured. Here, even if a trace of (C) remains in the preheated laminate, it volatilizes almost completely by the heating.

Heating condition may be adjusted properly depending on a thickness of the preheat laminate, heat resistance characteristic of an object to be coated, and a kind of (C) to be used, etc. The heating condition is, as one example, for one minute or more and 10 minutes or less at 70° C. or more and 150° C. or less, and preferably for 2 minutes or more and 5 minutes or less at 100° C. or more and 130° C. or less.

A film thickness of an antireflection film 9 is not particularly limited as long as strength of adhesiveness to a bottom member 2 becomes preferable and an occurrence of halation can be prevented on a surface formed with the membrane. An example of a preferable film thickness is preferably 2 μm or more, more preferably 5 μm or more and preferably 40 μm or less and more preferably 25 μm or less.

Note that a film thickness of an antireflection film 9 indicates a height including parts protruding, due to (B2) and (B1) in the membrane, from a surface of an object to be coated. The film thickness can be measured by a method based on JIS K7130.

<Characteristics of Membrane>

Characteristics of a membrane formed from a composition according to one mode are as below.

(Glossiness, Reflectance, L value, Optical Density and Adhesiveness)

A surface of a membrane formed from a composition according to one mode preferably has 60°-glossiness of less than 1%, 85°-glossiness of less than 5%, reflectance of 4% or less, an L value of 22 or less and an optical density of 1.0 or more.

Here, when configured that a membrane formed from a composition according to one mode is exposed as an outermost surface, 60°-glossiness, 85°-glossiness, reflectance, an L value and optical density on a real surface of the membrane are preferably in the ranges as above. On the other hand, when another membrane is coated on a membrane formed from a composition according to one mode, 60°-glossiness, 85°-glossiness, reflectance, an L value and optical density on a surface of this another membrane (that is, an outermost surface of the bottom member 2) are preferably in the ranges as above. Hereinafter, these surfaces will be referred to as "an outermost surface of a membrane".

An outermost surface of a membrane formed from a composition according to one mode preferably has 60°-glossiness of less than 1%, 85°-glossiness less than 5%, reflectance 4% or less, an L value 22 or less and an optical density 1.0 or more. When 60°-glossiness, 85°-glossiness, reflectance, an L value and optical density on an outermost surface of a membrane are in the ranges as above, it is possible to attain low glossiness, low reflectance (excellent antireflection, which will be the same below), a high blackness degree and a high light-shielding characteristic on the outermost surface of the membrane.

The uppermost value of 60°-glossiness is more preferably less than 0.8% and furthermore preferably less than 0.5%. When 60°-glossiness is adjusted to be in the range above, it is possible to enjoy an advantage of enhancing an enchantment of an article (an enchantment of an article is enhanced because reflection on the background is prevented). A lower limit value of 60°-glossiness is not particularly limited, and the lower, the better.

An uppermost value of 85°-glossiness is more preferably less than 3.5% and furthermore preferably less than 2.5%. By adjusting 85°-glossiness to be in the range above, angle dependency disappears and it becomes easy to obtain an advantage of enhancing an enchantment of an article from a high angle (an enchantment of an article is enhanced because reflection on the background is prevented also from a high angle). A lower limit of 85°-glossiness is not particularly limited, and the lower, the better.

An uppermost value of reflectance is more preferably 3% or less and furthermore preferably 2.5% or less. A lower limit value of reflectance is not particularly limited. The lower the reflectance is, the better. When reflectance is adjusted to be in the range above, it is possible to enjoy an advantage of enhancing an enchantment of an article (preventing reflection on the background).

An uppermost value of an L value (blackness degree) is more preferably 20 or less and furthermore preferably 18 or less. A lower limit value of an L value is not particularly limited. However, in terms of demands for real blackness on appearance, the lower, the better. When an L value is adjusted to be in the range above, the blackness is enhanced and blackness outstands so as to attain excellent designability, therefore, a higher appearance quality can be maintained.

The L value above is a lightness L*value on an outermost surface of a membrane, which is in CIE 1976 L*a*b* (CIELAB) color space system based on a SCE method. The SCE method is a specularly reflected light removal method, which means a method of measuring color by removing specularly reflected lights. Definition of the SCE method is defined in JIS Z8722 (2009). Since specularly reflected lights are removed in the SCE method, the color is close to the color actually viewed by human.

CIE is abbreviation of Commission Internationale de l'Eclairage, which means international committee on illumination. The CIELAB color space was adopted in 1976 in order to measure color difference between perception and devices and is a uniform color space defined in JIS Z 8781 (2013). Three coordinates in CIELAB are indicated by L*value, a*value and b*value. The L*value indicates lightness and expressed from 0 to 100. When L*value is 0, it indicates black, while it indicates white diffusion color when L*value is 100. The a*value indicates colors between red and green. When a*value is in minus, it indicates colors close to green, while when in plus, it indicates colors close to red. The b*value indicates colors between yellow and blue. When b*value is in minus, it indicates colors close to blue, while it indicates colors close to yellow when in plus.

A lower limit value of an optical density is more preferably 1.5 or more and furthermore preferably 2.0 or more. When optical density is adjusted to be in the range above, a light-shielding characteristic can be enhanced furthermore. An upper limit value of optical density is not particularly limited, and the higher, the better.

The glossiness, reflectance, an L value and optical density explained above can be measured by methods explained later on.

In addition to the characteristics (glossiness, reflectance, an L value and optical density) above, a membrane formed from a composition preferably has good adhesiveness to a surface of an object to be coated. Adhesiveness of a membrane formed from a composition to a surface of an object to be coated preferably satisfies that 75% or more of the coating remain as explained in adhesiveness evaluation in later-explained examples.

(Rz, Rsm, Rsk, Rku and Ra)

In a membrane formed from a composition according to one mode, it is preferable that a maximum height Rz is 7 μm or more, an average length Rsm of contour curve element is 80 μm or more, skewness Rsk of contour curve is 0.3 or less and Kurtosis Rku of a contour curve is 3 or more on the outermost surface. When Rz, Rsm, Rsk and Rku are in the ranges above on the uppermost surface, glossiness, optical density, reflectance and an L value on the outermost surface of a membrane can become in the ranges above (60°-glossiness less than 1%, 85°-glossiness less than 5%, reflectance 4% or less, an L value 22 or less and an optical density 1.0 or more), consequently, low glossiness, low reflectance, a high blackness degree and a high light-shielding characteristic on the outermost surface of a membrane can be attained.

The lower limit value of Rz is more preferably 10 μm or more. When the lower limit value of Rz is as above, low glossiness, low reflectance, and a high light-shielding characteristic can be adjusted furthermore easily.

An upper limit value of Rz is not particularly limited but is preferably 50 μm or less and more preferably 30 μm or less. When an upper limit value of Rz is as above, furthermore lower glossiness, lower reflectance, a higher blackness degree and a higher light-shielding characteristic on the outermost surface of a membrane can be attained easily.

The Rsm indicates an average length of contour curve elements within the standard length. A lower limit value of Rsm is more preferably 100 µm or more and furthermore preferably 120 µm or more. When a lower limit value of Rsm is as above, an advantage of low glossiness can be attained furthermore easily. An upper limit value of Rsm is not particularly limited, but preferably 160 µm or less. In this range, furthermore excellent adhesiveness between an object to be coated and a membrane to be formed thereon can be obtained.

The Rsk is an average of the cubes of a height $Z(x)$ in a dimentionless reference length obtained by a root mean square height (Zq) cubed, which is an index indicating deviation from an average line of uneven shape, that is, a degree of strain, on an outermost surface of a membrane. There is a tendency that when Rsk value is in plus (Rsk>0), the uneven shape is deviated to the concave side, so that protruding shape becomes sharp. On the other hand, when in minus (Rsk<0), the uneven shape is deviated to the convex side, so that protruding shape becomes dull. When the protruding shape of contour curve is dull, haze becomes low comparing with the case with a sharp shape.

An upper limit value of Rsk is more preferably 0.2 or less. When an upper limit value of Rsk is as above, an advantage of low glossiness can be obtained furthermore easily. A lower limit value of Rsk is not particularly limited but is preferably 0 or more. When a lower limit value of Rsk is as above, an advantage of low glossiness can be obtained easily.

The Rku indicates an average of the fourth-power of a height $Z(x)$ in a dimentionless reference length obtained by the four-power of a root-mean-square height (Zq), and is an index indicating a degree of sharpness at tips of unevenness on an outermost surface of a membrane. When Rku is larger, there are more sharp tips on unevenness, so that an inclined angle close to tips of unevenness becomes larger while inclined angles of other parts become smaller, so that reflection of background tends to arise. When Rku is smaller, there are more flat tips in uneven portions, so that an inclined angle at tips in unevenness becomes small, and it is liable that a disadvantage of reflecting on the background occur more easily.

A lower limit value of Rku is more preferably 3.3 or more. When a lower limit value of Rku is as above, an advantage of low glossiness can be obtained more easily. An upper limit value of Rku is not particularly limited, but is preferably 5 or less. When an upper limit value of Rku is as above, an advantage of low glossiness can be obtained more easily.

In a membrane formed from a composition according to one mode, an arithmetic average roughness (Ra) on an outermost surface is preferably 0.5 µm or more, more preferably 1.0 µm or more and furthermore preferably 1.5 µm or more.

Those Rz, Rsm, Rsk, Rku and Ra on an outermost surface of a membrane as explained above can be measured or calculated based on JIS B0601:2001.

(Other Modes)

An antireflection film 9 in one mod explained above may be formed directly without any pretreatment or via a pretreatment layer on a main surface side for mounting an article G of the bottom member 2, however, it is not limited to this mode. For example, it may be a mode, wherein an antireflection film sheet is prepared by forming an antireflection film 9 on an extremely thin plastic film (PET film, etc.) by spray coating, the sheet is cut to fit a shape of the main surface for mounting an article G of the bottom member 2 so as to obtain a sheet piece, and the sheet piece is adhered to the main surface side for mounting an article G of the bottom member 2 via an adhesive layer, so that an antireflection film 9 is finally formed.

EXAMPLES

Below, the present invention will be explained specifically based on examples (including modes and comparative examples), however, the present invention is not limited to the examples. Below, "part" indicates "part by mass" and "%" indicates "% by mass".

[Components of Composition]

As A (a resin component), a substance below was prepared.

A1: thermosetting acrylic resin
(ACRYDIC A801 by DIC Corporation, solid content 50%)

As B1 (small particles) falling under B (unevenness forming particles), substances below were prepared.

B1a: carbon black (CB) (particle diameter 150 nm)
(MHI Black_#273 by MIKUNI Color Ltd., CB content 9.5%)

B1b: transparent silica (particle diameter 58 nm)
(ACEMATT R972 by EVONIK)

As B2 (large particles) falling under B, substances below were prepared.

B2a: composite silica (particle diameter 3 µm)
(BECSIA ID by Fuji Silysia Chemical Ltd.)

B2b: black acrylic beads (particle diameter 3 µm)
(RUBCOULEUR 224SMD black by Dainichiseika Color & Chemicals Mfg Co., Ltd.)

B2c: transparent silica (particle diameter 4.1 µm)
(SYLYSIA 430 by Fuji Silysia Chemical Ltd.)

B2d: transparent silica (particle diameter 8 µm)
(SYLYSIA 450 by Fuji Silysia Chemical Ltd.)

B2e: transparent acrylic beads (particle diameter 3 µm)
(ENEOS Uni-Powder NMB-0320C by ENEOS Corporation)

Note that BECSIA ID used as B2a (composite silica) is composite particles of CB and silica, wherein CB/silica=about 25/75 (mass ratio). The MHI black_#273 used as B1a (CB) is a CB dispersant and, in a solid content total amount 18% of the dispersant, 9.5% is CB and remaining 8.5% is other compounds. In the 8.5% of remaining compounds, 3% is a copper compound and 5.5% is an acrylic resin.

As D (an optional component), a substance below was prepared.

D1: isocyanate compound
(TAKENATE D110N by Mitsui Chemicals, Inc., solid content 75%)

[Object to be Coated]

As an object to be coated, a sample substrate for evaluation was prepared. As a sample substrate for evaluation, a sheet material made of a black polycarbonate was used, and a rectangular polycarbonate flat plate (a longitudinal side 100 mm, width 50 mm and thickness 1.5 mm) produced to have a mat surface on both of plate surfaces in the thickness (X) direction was used.

Examples 1 to 17

1. Preparation of Composition

Respective components for each example with each solid content ratio shown in Table 1 were prepared, so that a total solid content becomes approximately 25% by mass, and added to a necessary amount of (C) a diluent solvent, which is a mixed solvent (methylethyl ketone:butyl acetate=50:50), and agitated to mix, and a liquid composition (hereinafter, also simply referred to as "a liquid") was prepared.

2. Production of Sample for Evaluation

Each liquid obtained for each of the examples was sprayed toward an outer surface of an object to be coated by spray coating in the same method as explained in (3-1) Coating Performance below. Then, the resultant was heated at 120° C. for 3 minutes to dry, a solid particle laminate was formed by spray coating and heated to be a coating (hereinafter, also simply referred to as "a coating") having an average membrane thickness of 20 μm on a surface of the object to be coated, so that each sample for evaluation was obtained.

3. Evaluation

On each liquid obtained in each of the examples, a variety of characteristics (coating performance) were evaluated (liquid evaluation) in the methods explained below. Also, a coating formed on a sample for evaluation obtained in each example was evaluated (sample evaluation) on a variety of characteristics (characteristics and surface properties) in the methods explained below. The results are shown in Table 1.

[Liquid Evaluation]

(3-1) Coating Performance

Coating performance of a liquid was evaluated by observing coating uniformity after spray coating.

An air spray, wherein an air brush (Spray-Work HG Single Airbrush by TAMIYA, Inc.) was attached to an air can (Spray-Work Air Can 420D by TAMIYA, Inc.), was prepared and each liquid was poured therein. Then, the liquid was sprayed toward an outer surface of an object to be coated for 10 seconds from a 10 cm distance from a tip of the air brush, and a formed solid particle laminate was evaluated its coating uniformity visually. Evaluation reference is as below.

○: Lack of coating uniformity (lack of uniformity in thickness) was not observed.

Δ: Lack of coating uniformity was observed partially.

X: Lack of coating uniformity was observed in many areas.

[Sample Evaluation]

(3-2) Characteristics

—Glossiness—

Glossiness against a measurement light having an incident angle of 60° (specular glossiness at 60°) and glossiness against light having an incident angle of 85° (specular glossiness at 85°) on a surface of a coating formed on each evaluation sample were measured on 9 spots by using a glossmeter (VG 7000 by NIPPON DENSHOKU Industries Co., Ltd.) by the method based on JIS Z8741, and an average value thereof was adopted as a glossiness degree. Evaluation reference is as below.

(Specular Glossiness at)60°

◎: less than 0.8%. (extremely excellent)

○: 0.8% or more but less than 1%. (excellent)

X: 1% or more. (insufficient)

(Specular Glossiness at)85°

◎: less than 3.5%. (extremely excellent)

○: 3.5% or more but less than 5%. (excellent)

X: 5% or more. (insufficient)

(Comprehensive Evaluation on Glossiness)

◎: Both of the evaluations on 60°-specular glossiness and 85°-specular glossiness were ◎. (extremely preferable low glossiness)

○: At least one of the evaluation on 60°-specular glossiness and 85°-specular glossiness were C but none was X. (preferable low glossiness)

X: At least one of the evaluation on 60°-specular glossiness and 85°-specular glossiness was X. (insufficiently low glossiness)

—Reflectance—

Reflectance against a light having a wavelength from 400 nm to 700 nm on a surface of coating formed on each evaluation sample was measured at 9 spots at 1 nm intervals by using a spectral colorimeter (CM-5 by Konica Minolta Inc.) by the method based on JIS Z8722, and an average value thereof was adopted as reflectance. Evaluation reference is as below.

◎: Reflectance was 3% or less. (extremely preferable low reflectance)

○: Reflectance exceeded 3% but 4% or less. (preferable low reflectance)

X: Reflectance exceeded 4%. (not low enough reflectance)

—Blackness Degree—

A degree of blackness on a surface of a coating formed on each evaluation sample was evaluated by measuring lightness L*value in CIE 1976 L*a*b* (CIELAB) color space system on the surface by the SCE method. The lightness L*value was measured by using a spectral colorimeter (CM-5 produced by Konica Minolta Inc.) by the method based on JIS Z8781-4:2013. Evaluation reference is as below.

When measuring, a CIE standard light source D65 was used as a light source and L* value in the CIELAB color space system was obtained at a viewing angle of 10° by the SCE method. The CIE standard light source D65 is defined in JIS Z8720 (2000) "Standard Illuminants and Sources for Colorimetry", and ISO 10526 (2007) also shows the same definition. The CIE standard light source D65 is used in the case of displaying colors of an object illuminated by daylight. A viewing angle of 10° is defined in JIS Z8723 (2009) "Methods of Visual Comparison for Surface Colours", and ISO/DIS 3668 also shows the same definition.

◎: An L value was 20 or less. (extremely high degree of blackness)

○: An L value exceeded 20 but 22 or less. (high degree of blackness)

X: An L value exceeded 22. (insufficient degree of blackness)

—Light-Shielding Characteristic—

A light-shielding characteristic of a coating formed on each evaluation sample was evaluated by calculating an optical density of the coating. An optical density of a coating formed on each evaluation sample was obtained by using an optical density meter (X-rite 361T (ortho filter) by Nihon Heihan Kizai Kabushiki Kaisha), irradiating a vertical transmission light flux to the coated film side of a sample, and calculating by expressing a ratio with respect to a state without a coating film in log (logarithms). An optical density of 6.0 or more is an upper limit value of detection in the measurement. Evaluation reference is as below.

◎: An optical density was 1.5 or more. (extremely preferable light-shielding characteristic)

○: An optical density was 1.0 or more but less than 1.5. (preferable light-shielding characteristic)

X: An optical density was less than 1.0. (insufficient light-shielding characteristic)

—Adhesiveness—

Adhesiveness of a coating film formed on each evaluation sample to a surface of an object to be coated was evaluated by cutting the coating film in a grid pattern with a market-available cutter, putting thereon a cellophane tape (Cellulose tape by NICHIBAN Co., Ltd.), then taking off the tape, and visually observing a remaining state of the coating film. Evaluation reference is as below.

⊚: A coating film remained 100%. (extremely high adhesiveness)
○: A coating film remained 75% or more and less than 100%. (high adhesiveness)
X: A coating film remained less than 75%. (insufficient adhesiveness)

—Comprehensive Evaluation—

Glossiness, reflectance, a blackness degree, light-shielding characteristic and adhesiveness as above were evaluated comprehensively. Evaluation reference is as below.

⊚: Evaluations on glossiness, reflectance, a blackness degree, light-shielding characteristic and adhesiveness were all ⊚.
○: At least one of the evaluations on glossiness, reflectance, a blackness degree, light-shielding characteristic and adhesiveness was ○, and there was no X.
X: At least one of the evaluations on glossiness, reflectance, a blackness degree, light-shielding characteristic and adhesiveness was X.

(3-3) Surface Properties

—Rz Value, Rsm Value, Rsk Value, Rku Value and Ra Value—

Properties (Rz value, Rsm value, Rsk value, Rku value and Ra value) of a surface of a coating film formed on each sample was measured by using a surface roughness measuring device (SURFCOM 480B by TOKYO SEIMITSU Co., Ltd.) based on JIS B0601:2001. Evaluation reference is as below.

(Rz)
⊚: Rz was 10 μm or more. (extremely preferable)
○: Rz was 7 μm or more but less than 10 μm. (preferable)
X: Rz was less than 7 μm. (defective)

(Rsm)
⊚: Rsm was 120 μm or more. (extremely preferable)
○: Rsm was 80 μm or more but less than 120 μm. (preferable)
X: Rsm was less than 80 μm. (defective)

(Rsk)
⊚: Rsk was 0.2 or less. (extremely preferable)
○: Rks exceeded 0.2 but 0.3 or less. (preferable)
X: Rsk exceeded 0.3. (defective)

(Rku)
⊚: Rku was 3.3 or more. (extremely preferable)
○: Rku was 3 or more but less than 3.3. (preferable)
X: Rku was less than 3. (defective)

(Ra)
⊚: Ra was 1.5 μm or more. (extremely preferable)
○: Ra was 0.5 μm or more but less than 1.5 μm. (preferable)
X: Ra was less than 0.5 μm. (defective)

TABLE 1

| COMPONENTS | | | | EXAMPLES | | | | | | | | | |
|---|---|---|---|---|---|---|---|---|---|---|---|---|---|
| | | | | 1 | 2 | 3 | 4 | 5 | 6 | 7 | 8 | 9 | 10 |
| A | A1 | | ACRYLIC RESIN | 60 | 60 | 60 | 60 | 60 | 60 | 60 | 60 | 60 | 60 |
| D | D1 | | ISOCYANATE COMPOUND | 40 | 40 | 40 | 40 | 40 | 40 | 40 | 40 | 40 | 40 |
| B | B1 | B1a | CARBON BLACK (150 nm) | 20.0 | 19.0 | 15.0 | 13.0 | 12.0 | 15.0 | 15.0 | 15.0 | 15.0 | — |
| | | B1b | TRANSPARENT SILICA (58 nm) | — | — | — | — | — | — | — | — | — | 15.0 |
| | B2 | B2a | COMPOSITE SILICA (3 μm) | 35.0 | 36.0 | 40.0 | 42.0 | 43.0 | — | — | — | — | 40.0 |
| | | B2b | BLACK ACRYLIC BEADS (3 μm) | — | — | — | — | — | 40.0 | — | — | — | — |
| | | B2c | TRANSPARENT SILICA (4.1 μm) | — | — | — | — | — | — | — | 40.0 | — | — |
| | | B2d | TRANSPARENT SILICA (8 μm) | — | — | — | — | — | — | — | — | 40.0 | — |
| | | B2e | TRANSPARENT ACRYLIC BEADS (3 μm) | — | — | — | — | — | — | 40.0 | — | — | — |
| | ※B1:B2 = 1:● (MASS RATIO) | | | 1.75 | 1.89 | 2.67 | 3.23 | 3.58 | | | | | |
| | ※(A + B + D):B = 100:● (MASS RATIO) | | | 35.5 | 35.5 | 35.5 | 35.5 | 35.5 | 35.5 | 35.5 | 35.5 | 35.5 | 35.5 |
| LIQUID MEMBRANE CHARACTERISTICS | APPLICABILITY | | | ○ | ○ | ○ | ○ | ○ | ○ | ○ | ○ | ○ | ○ |
| | GLOSSINESS (60°SPECULAR GLOSSINESS) | | | ○ | ○ | ⊚ | ⊚ | ⊚ | ○ | ○ | ○ | ⊚ | ○ |
| | GLOSSINESS (85°SPECULAR GLOSSINESS) | | | ○ | ○ | ⊚ | ⊚ | ⊚ | ○ | ○ | ⊚ | ⊚ | ○ |
| | COMPREHENSIVE GLOSSINESS | | | ○ | ○ | ⊚ | ⊚ | ⊚ | ○ | ○ | ○ | ⊚ | ○ |
| | REFLECTANCE (ANTIREFLECTION CHARACTERISTIC) | | | ○ | ○ | ⊚ | ⊚ | ⊚ | ○ | ○ | ○ | ○ | ○ |
| | L VALUE (L * VALUE IN CIELAB COLOR SPACE SYSTEM) | | | X | ○ | ⊚ | ⊚ | ⊚ | X | X | ○ | X | ○ |

TABLE 1-continued

| | | | | | | | | | | |
|---|---|---|---|---|---|---|---|---|---|---|
| | LIGHT-SHIELDING CHARACTERISTIC | ◎ | ◎ | ◎ | ○ | X | ○ | X | ○ | X | ○ |
| | ADHESIVENESS | ◎ | ◎ | ◎ | ○ | X | ◎ | ◎ | ◎ | X | ◎ |
| | ※COMPREHENSIVE EVALUATION ON MEMBRANE CHARACTERISTICS | X | ○ | ◎ | ○ | X | X | X | ○ | X | ○ |
| MEMBRANE PROPERTY | Rz | X | ○ | ◎ | ◎ | ◎ | ○ | ○ | ○ | ○ | ○ |
| | Rsm | ○ | ○ | ◎ | ◎ | ◎ | ○ | ○ | ○ | ○ | ○ |
| | Rsk | X | ○ | ◎ | ○ | ○ | ○ | ○ | ○ | ○ | ○ |
| | Rku | ◎ | ◎ | ◎ | ○ | ○ | ○ | ○ | ○ | ○ | ○ |
| | Ra | ○ | ○ | ◎ | ◎ | ◎ | ○ | ○ | ○ | ○ | ○ |

| | | | | | EXAMPLES | | | | | | | |
|---|---|---|---|---|---|---|---|---|---|---|---|---|
| | COMPONENTS | | | | 11 | 12 | 13 | 14 | 3 | 15 | 16 | 17 |
| A | A1 | | ACRYLIC RESIN | | 60 | 60 | 60 | 60 | 60 | 60 | 60 | 60 |
| D | D1 | | ISOCYANATE COMPOUND | | 40 | 40 | 40 | 40 | 40 | 40 | 40 | 40 |
| B | B1 | B1a | CARBON BLACK (150 nm) | | 15.0 | — | 5.0 | 10.0 | 15.0 | 25.0 | 35.0 | 45.0 |
| | | B1b | TRANSPARENT SILICA (58 nm) | | 40.0 | 15.0 | — | — | — | — | — | — |
| | B2 | B2a | COMPOSITE SILICA (3 μm) | | — | — | 16.0 | 19.0 | 40.0 | 62.0 | 80.0 | 120.0 |
| | | B2b | BLACK ACRYLIC BEADS (3 μm) | | — | 40.0 | — | — | — | — | — | — |
| | | B2c | TRANSPARENT SILICA (4.1 μm) | | — | — | — | — | — | — | — | — |
| | | B2d | TRANSPARENT SILICA (8 μm) | | — | — | — | — | — | — | — | — |
| | | B2e | TRANSPARENT ACRYLIC BEADS (3 μm) | | — | — | — | — | — | — | — | — |
| | ※B1:B2 = 1:● (MASS RATIO) | | | | | | 3.20 | 1.90 | 2.67 | 2.48 | 2.29 | 2.67 |
| | ※(A + B + D):B = 100:● (MASS RATIO) | | | | 35.5 | 35.5 | 17.4 | 22.5 | 35.5 | 46.5 | 53.5 | 62.3 |
| LIQUID MEMBRANE CHARACTER-ISTICS | APPLICABILITY | | | | ○ | ○ | ○ | ○ | ○ | ○ | ○ | ○ |
| | GLOSSINESS (60°SPECULAR GLOSSINESS) | | | | X | ○ | X | ○ | ◎ | ○ | ○ | ○ |
| | GLOSSINESS (85°SPECULAR GLOSSINESS) | | | | X | ○ | X | ○ | ◎ | ◎ | ◎ | ○ |
| | COMPREHENSIVE GLOSSINESS | | | | X | ○ | X | ○ | ◎ | ○ | ○ | ○ |
| | REFLECTANCE (ANTIREFLECTION CHARACTERISTIC) | | | | X | ○ | X | ○ | ◎ | ○ | ○ | ○ |
| | L VALUE (L * VALUE IN CIELAB COLOR SPACE SYSTEM) | | | | X | X | X | ○ | ◎ | ○ | ○ | ○ |
| | LIGHT-SHIELDING CHARACTERISTIC | | | | ○ | X | X | ○ | ◎ | ○ | ○ | ○ |
| | ADHESIVENESS | | | | X | ○ | ◎ | ◎ | ◎ | ○ | ○ | X |
| | ※COMPREHENSIVE EVALUATION ON MEMBRANE CHARACTERISTICS | | | | X | X | X | ○ | ◎ | ○ | ○ | X |
| MEMBRANE PROPERTY | Rz | | | | X | ○ | X | ○ | ◎ | ◎ | ◎ | ◎ |
| | Rsm | | | | X | X | X | ○ | ◎ | ◎ | ◎ | ◎ |
| | Rsk | | | | X | X | X | ○ | ◎ | ◎ | ○ | ○ |
| | Rku | | | | X | X | X | ○ | ◎ | ◎ | ○ | ○ |
| | Ra | | | | X | ○ | X | ○ | ◎ | ◎ | ◎ | ◎ |

4. Consideration

As shown in Table 1, when a liquid for forming a membrane did not comprise as (B) one or more of (B1) and (B2) (Examples 6, 7, 9, 11 and 12), at least one of the membrane characteristics of glossiness, reflectance, an L value, light-shielding characteristic and adhesiveness was not satisfied. On the other hand, even both of (B1) and (B2) were contained as (B) in the liquid (Examples 1 to 5, 8 and 10), when a mass ratio of (B2) with respect to (B1):1 was 1.75 or less (Example 1) or 3.58 or more (Example 5), at least one of an L value and adhesiveness as membrane characteristics was not satisfied. Even if both of (B1) and (B2) are contained and a mass ratio of (B2) with respect to (B1):1 was in a proper range (exceeding 1.75 and less than 3.58) (Examples 2 to 4 and 13 to 17), when a content (total amount) of (B) in 100% by mass of a total solid content was less than 20% by mass (Example 13) or exceeding 60% by mass (Example 17), one or more of the membrane characteristics, which are glossiness, reflectance, an L value, light-shielding characteristic and adhesiveness, was not satisfied.

On the other hand, when a range of a mass ratio of (B2) with respect to (B1): 1 was exceeding 1.75 and less than 3.58 and a total content of (B) with respect to a total solid amount of 100% by mass in a composition was 20% by mass or more and 60% by mass or less (Examples 2 to 4, 8, 10 and 14 to 16), coating performance of a liquid and membrane characteristics, and membrane properties were all satisfied.

DESCRIPTION OF NUMERICAL NOTATIONS

1 . . . collection case (furniture for appreciation, etc. of an article)
2 . . . bottom member (mounting stand)
4 . . . transparent cover
9 . . . antireflection film
G . . . article (object of appreciation, etc.)

The invention claimed is:

1. A furniture used for admiration, storage, exhibition, and appreciation of an article, comprising at least a mounting stand for mounting an article, wherein
the mounting stand has a black antireflection film on a main surface side for mounting an article; and
the antireflection film is formed of a membrane made from a liquid composition to have a thickness of 2 μm or more and 40 μm or less by spray coating;
the liquid composition consists of (A), (B), (C), and (D), wherein
(A) is a resin component including a thermosetting resin;
(B) is inorganic-type particles;
(B) is contained in an amount of 20% by mass or more and 60% by mass or less in a total amount of 100% by mass of all solid content in the liquid composition;
(B) consists of (B1) and (B2), wherein a total amount of (B1) and (B2) in 100% by mass of (B) is 100% by mass, and a mass ratio of (B2) with respect to (B1) is 1.8 or more and 3.3 or less;
(B1) is inorganic-type small particles having a particle diameter ($d_1$) of 0.05 μm or more and 0.4 μm or less;
(B2) is inorganic-type large particles having a particle diameter ($d_2$) of 3 μm or more and 6 μm or less;
(B2) is a composite silica obtained by synthesizing carbon black and silica particles;
(C) is a diluent solvent; and
(D) is a curing agent of the thermosetting resin.

2. The furniture according to claim 1, wherein (B1) consists of carbon black.

3. The furniture according to claim 2, wherein an outermost surface of a plane formed with the membrane has glossiness of less than 1% against an incident light with an incident angle of 60°, glossiness of less than 5% against an incident light with an incident angle of 85°, reflectance of 4% or less against a light having a wavelength of 550 nm, an L value of 22 or less in CIELAB color space system by SCE method and an optical density of 1.0 or more.

4. The furniture according to claim 2, further comprising a transparent cover to enclose the article mounted on the mounting stand, the transparent cover being see-through.

5. The furniture according to claim 1, wherein an outermost surface of a plane formed with the membrane has glossiness of less than 1% against an incident light with an incident angle of 60°, glossiness of less than 5% against an incident light with an incident angle of 85°, reflectance of 4% or less against a light having a wavelength of 550 nm, an L value of 22 or less in CIELAB color space system by SCE method and an optical density of 1.0 or more.

6. The furniture according to claim 5, wherein, on an outermost surface of a plane formed with the membrane, a maximum height Rz based on JIS B0601:2001 is 7 μm or more, an average length Rsm of contour curve elements is 80 μm or more, a skewness Rsk of a contour curve is 0.3 or less, and Kurtosis Rku of a contour curve is 3 or more.

7. The furniture according to claim 1, furthermore comprising a transparent cover to enclose the article mounted on the mounting stand, the transparent cover being see-through.

8. A black antireflection film formed on a mounting stand for mounting an article in a furniture used for admiration, storage, exhibition, and appreciation of the article, the antireflection film formed of a membrane made from a liquid composition to have a thickness of 2 μm or more and 40 μm or less by spray coating, wherein:
the liquid composition consists of (A), (B), (C), and (D), wherein
(A) is a resin component including a thermosetting resin;
(B) is inorganic-type particles;
(B) is contained in an amount of 20% by mass or more and 60% by mass or less in a total amount of 100% by mass of all solid content in the liquid composition;
(B) consists of (B1) and (B2), wherein a total amount of (B1) and (B2) in 100% by mass of (B) is 100% by mass, and a mass ratio of (B2) with respect to (B1) is 1.8 or more and 3.3 or less;
(B1) is inorganic-type small particles having a particle diameter ($d_1$) of 0.05 μm or more and 0.4 μm or less;
(B2) is inorganic-type large particles having a particle diameter ($d_2$) of 3 μm or more and 6 μm or less;
(B2) is a composite silica obtained by synthesizing carbon black and silica particles;
(C) is a diluent solvent; and
(D) is a curing agent of the thermosetting resin.

9. The antireflection film according to claim 8, wherein (B1) consists of carbon black.

* * * * *